United States Patent [19]

Matsui et al.

[11] Patent Number: 5,367,565
[45] Date of Patent: Nov. 22, 1994

[54] MIXED MODE COMMUNICATION APPARATUS

[75] Inventors: Tsunehiro Matsui; Toshiaki Koue, both of Saitama, Japan

[73] Assignee: Fuji Xerox Co., Ltd., Tokyo, Japan

[21] Appl. No.: 959,924

[22] Filed: Oct. 15, 1992

[30] Foreign Application Priority Data

Oct. 16, 1991 [JP] Japan ................................. 3-294906

[51] Int. Cl.$^5$ .......................................... H04M 11/00
[52] U.S. Cl. ...................................... 379/100; 379/93; 358/450; 358/468
[58] Field of Search .................. 379/100, 355, 356, 93; 358/451, 450, 452, 444, 440, 468

[56] References Cited

U.S. PATENT DOCUMENTS

| 4,641,197 | 2/1987 | Miyagi | 358/450 |
| 4,811,111 | 3/1989 | Kurokawa | 358/440 |
| 5,086,434 | 2/1992 | Abe et al. | 358/450 |

FOREIGN PATENT DOCUMENTS

| 58-107770 | 6/1983 | Japan | 358/440 |
| 63-70659 | 3/1988 | Japan . | |
| 64-24567 | 1/1989 | Japan . | |
| 3-44259 | 2/1991 | Japan . | |

Primary Examiner—Curtis Kuntz
Assistant Examiner—Jason Chan
Attorney, Agent, or Firm—Finnegan, Henderson, Farabow, Garrett & Dunner

[57] ABSTRACT

A mixed mode communication apparatus is disclosed which is capable of adding to the body of a document to be transmitted to specific called stations information which is added at high frequency by a simple manner. A quick dial of a called station is registered in a quick dial memory section. The stereotyped expressions used for each called station is registered as quick block data in a quick block data memory section. A common block number is assigned to the quick block data and the quick dial in order to secure the association of the quick block data with the quick dial. In response to a quick dial number entered from a keyboard, a block search section searches the quick block data memory section on the basis of the block number attached to the quick dial, and reads intentional quick block data out of the memory section. The readout quick block data is loaded into a buffer. After a block layout confirming section confirms the fact that the readout quick block data and the block data in a block data memory section do not overlap, those block data are sent out to a called station.

8 Claims, 3 Drawing Sheets

MIXED MODE COMMUNICATION APPARATUS

BACKGROUND OF THE INVENTION

1. Field of the Invention

The present invention relates to a mixed mode communication apparatus, and more particularly to a mixed mode communication apparatus which is capable of adding to the body of a document to be transmitted to specific called stations information which is added at high frequency by a simple manner.

2. Description of the Related Art

There is known a document processor for preparing a mixed mode document, which contains both character data blocks and image data blocks. The document prepared by this type of apparatus is transmitted to another document processing apparatus which then prints out or displays the received document.

Before transmission of the document, a calling or transmitting station communicates with a called or receiving station for getting the information on the communication functions of the called station. Then, it selects the best communication mode, and starts transmission of document data. Since this communication apparatus has a multiple of functions, much time is taken for selecting the best communication mode. This is disadvantageous.

To reduce the time for communication mode selection, there is proposed a communication apparatus of a type which contains data on the communication functions of the called stations in a registering manner, and refers to the function data before document data communication (Published Unexamined Japanese Patent Application No. Sho. 63-70659).

The just-mentioned communication apparatus still has the following problems.

The apparatus a tendency to add the same type of information to documents which are to be transmitted frequently to specific other stations. Examples of the same type of information are the addresses and names of addressees and addressers and stereotyped expressions or cliche.

Because the stereotyped information is prepared and added to the document body, every document transmission results in time-consuming and troublesome work. The prior communication apparatus succeeds in reducing the time needed to select the best communication mode, but takes no measure for improvement of the working efficiency.

A terminal device in which title data can be added to the document body is disclosed in Published Unexamined Japanese Patent Application No. Sho. 64-24567. Title data, together with document data, is stored in the terminal device. When the device is operated for printing, the title data is read out and printed out as a header or footer.

In the terminal device, a relatively short stereotyped message, or title data, can be printed out on plural pages, which form a page set. However, it is impossible to correspondingly transmit the stereotyped data, together with the related document data, to different called stations and to cause them to print the data, since title data is stored association with document data.

SUMMARY OF THE INVENTION

The present invention has been made in view of the above circumstances and has an object to provide a mixed mode communication apparatus which can add to a document body, the stereotyped data specified for a desired called station before the document is transmitted.

To solve the problem and achieve the above object, there is provided a mixed mode communication apparatus comprising quick dial storing means for storing dial numbers of called stations in association with quick dial numbers, quick block data storing means for storing stereotyped data corresponding to each dial number that is stored in the quick dial storing means, adding means operating such that when a quick dial is received, the adding means reads the stereotyped data associated with the received quick dial from the quick block data storing means, the adding means adding the readout stereotyped data to document body data to be transmitted, block layout confirming means for confirming a layout of the blocks depending on whether or not the stereotyped data laps over document body data when the stereotyped data is added to the document body data, and overlap processing means for performing an editorial processing so as to prevent the stereotyped data from lapping over the document body data when the block layout confirming means confirms that the stereotyped data laps over the document body data.

In forming and transmitting a document by the mixed mode communication apparatus thus arranged, quick block data, which is previously registered in association with the quick dial, or the called station, is automatically added to the document. The term "quick block data" used here has the same construction as that of the block data usually used in the mixed mode document. The reason why the term is used in this specification is that the block data is registered in association with quick dial.

BRIEF DESCRIPTION OF THE DRAWINGS

The accompanying drawings, which are incorporated in and constitute a part of this specification, illustrate an embodiment of the invention and, together with the description, serve to explain the objects, advantages and principles of the invention. In the drawings.

DESCRIPTION OF THE PREFERRED EMBODIMENTS

Figure 2:
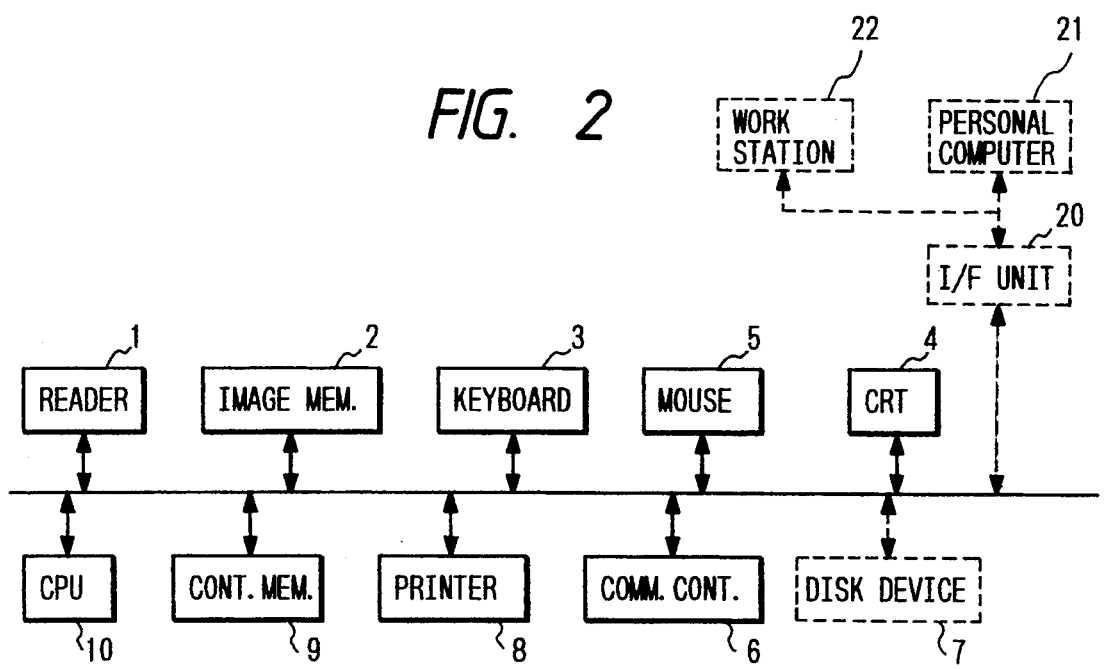
FIG. 2 is a block diagram showing the hardware construction of the communication apparatus.

The present invention will be described with reference to the accompanying drawings. FIG. 2 is a block diagram showing a hardware construction of a mixed mode communication apparatus according to an embodiment of the present invention. In the figure, image data of an original sheet is read by a reading device 1 and picture image data received through a communication controller 6 from another document processor, are stored into a picture image memory 2. Such information as alphanumeric, symbols, and the like, entered by operations on a keyboard 3, is stored as given character codes or character data into the picture image memory 2. The picture information stored in the picture image memory 2 is put on a CRT (cathode ray tube) 4, and, with reference to the information thus displayed on this CRT 4, such editorial jobs as deletion, insertion, enlargement, and reduction of picture image are carried out by operations performed on the keyboard 3 or by operating a mouse 5. The edited information is processed in the picture image memory 2, and can be stored in a disk device 7 as an external memory device provided as necessary to the apparatus. The edited data can also be sent to a receiving station, through the communication controller 6.

The document data received by the mixed mode communication apparatus is temporarily stored in the picture image memory 2, and, in response to an instruction, is output to a printer 8 or the CRT 4.

Moreover, the received document data is also displayed on the CRT 4 to be edited thereon before the data is printed out by the printer 8. With operations performed in this manner, this communication apparatus is capable of printing not merely the document data as received, but also the document data as edited at discretion.

The individual component elements mentioned above are controlled by a Central Processing Unit (CPU) in accordance with programs and control data which are stored in advance in a control memory 9.

As shown in FIG. 2, a personal computer 21 and a work station 22 may be connected through an I/F unit 20 instead of the keyboard 3, the CRT 4 and the mouse 22.

Next, the functions of this example of embodiment will be described with reference to FIG. 1, which presents a block diagram showing the principal functions of the mixed mode communication apparatus of the instant embodiment, which are for executing an operation to be given later.

Figure 1:
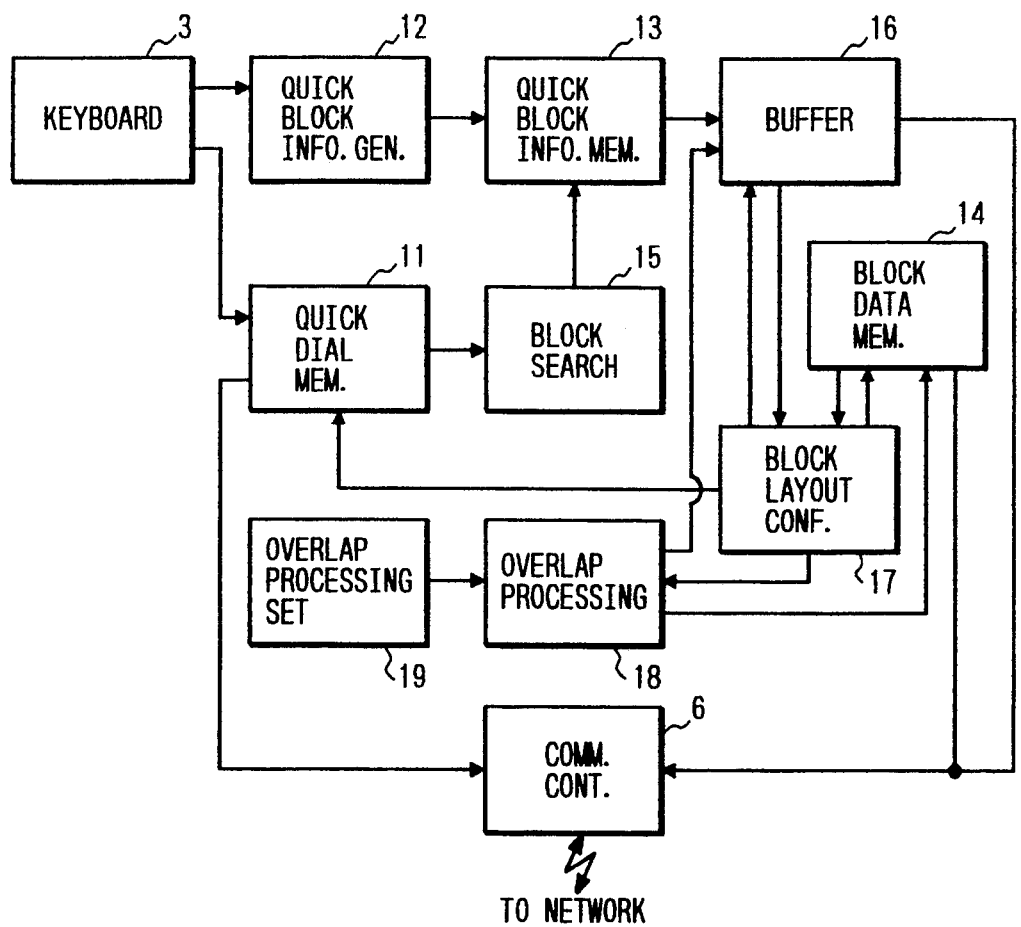
FIG. 1 is a block diagram showing the principal functions of a mixed mode communication apparatus according to an embodiment of the present invention.

In FIG. 1, a quick dial memory section 11 stores a dial number and a quick code, or quick dial, that Are entered through preset procedural steps of operations on the keyboard 3. In this case, the dial number registered therein corresponds to the quick dial.

A quick block information generating section 12 generates quick block data, which contains character data and image data entered from the keyboard 3 or the reading device 1. The quick block information generating section 12 includes the CRT 4 of displaying stereotyped data on the basis for the entered character data and image data, coordinates detecting means for detecting the coordinates representative of a position of the stereotyped data on the CRT 4, and so forth.

The quick block data generated by the quick block information generating section 12, together with a block number entered from the keyboard 3, is stored into a quick block data memory section 13. In order that quick block data can be read in connection with the quick dial number from the quick block data memory section 13, a register block number as well as the quick dial number is stored in the quick dial memory section 11.

A block data memory section 14 stores block data, which is generated through an ordinary mixed mode preparation procedure, and does not correspond to the quick dial. The block data is based on the data entered from the keyboard 3 or the reading device 1.

A block search section 15 searches a block number, which is registered in connection with the dial number registered in the quick dial memory section 11, and reads out of the quick block data memory section 13 the quick block data registered therein in association with the searched block number, and loads it into a buffer 16.

A block layout confirming section 17 confirms a layout of the blocks by checking whether or not the quick block data stored in the buffer 16 laps over the block data, or document body data, stored in the block data memory section 14. The block layout confirming section 17 reads the coordinates of the quick block data and the document body data, and performs the block layout confirmation job on the basis of those coordinates data.

As the result of the confirmation job, if the blocks do not overlap each other, that is, the blocks are properly laid out, the confirming section produces a proper signal, reads the dial number from the quick dial memory section 11, and sends it out to the communication line, through the communication controller 6. When receiving a response from the called or remote data receiving station, the communication controller 6 reads the block data from the buffer 16 and the block data memory section 14, and sends it out to the communication line.

If the blocks overlap, that is, the blocks are improperly laid out, the block layout confirming section 17 transfers an improper signal to an overlap processing section 18. In response to the improper signal, the overlap processing section 18 processes the layout data (coordinates values) of the block data of the buffer 16 and the block data memory section 14 to rearrange the block data so that these data will not overlap.

Procedures dealing with the case where the blocks overlap are stored in advance in an overlap-processing setting section 19. In accordance with the setting of contents of the overlap processing section, the overlap processing section 18 attaches to the data, a flag indicating that the document data is sent in a state that the blocks overlap and the layout data is intact or that the quick block data is written over the block data or the former is written over the latter.

Upon completion of the overlap processing, the overlap processing section 18 sends an end signal to the buffer 16 and the block data memory section 14, which in turn produce the stored data toward the communication controller 6.

Figure 3:
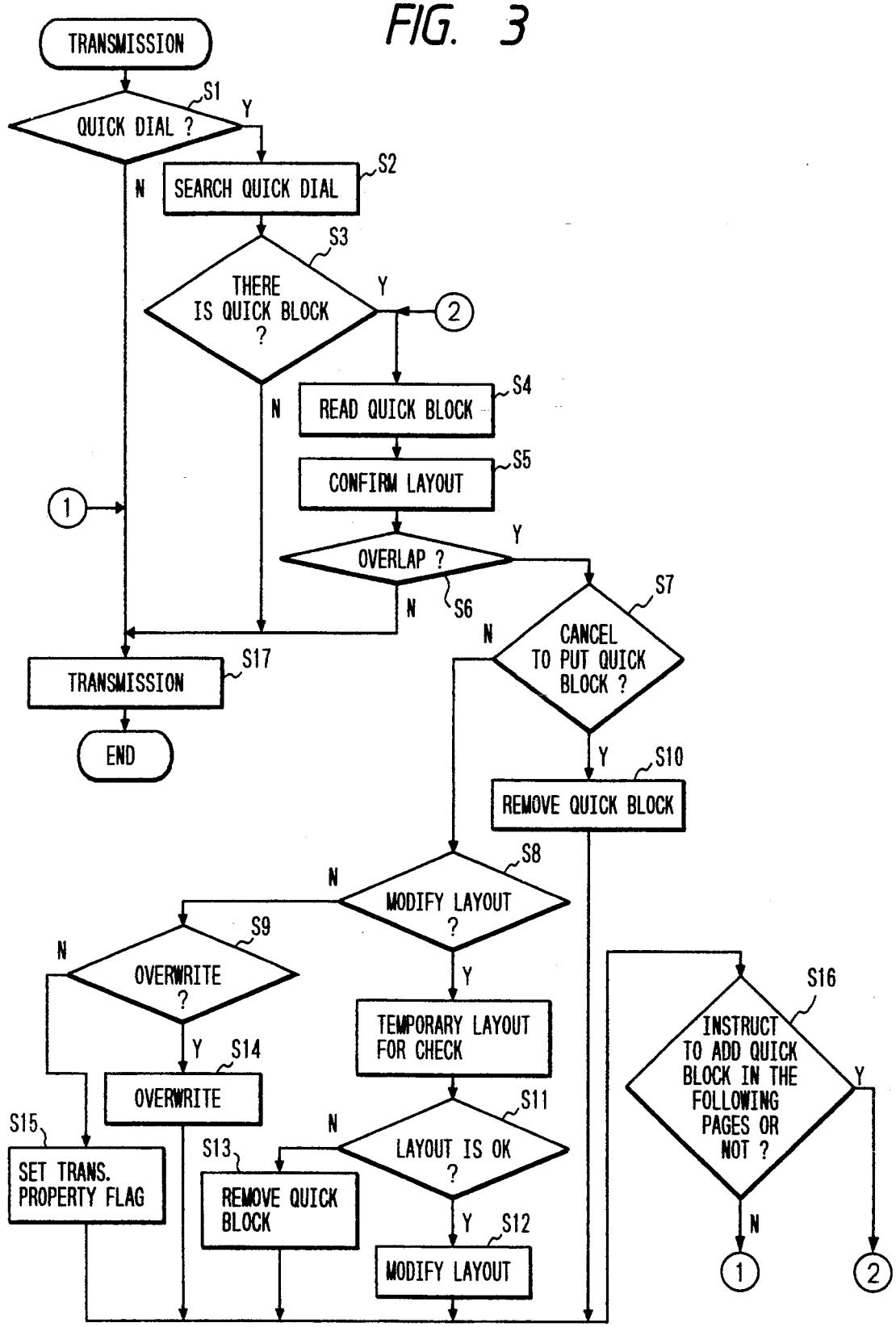
FIG. 3 is a flow chart showing the transmission operation of the mixed mode communication apparatus.

A procedure of transmitting a document carried out by the communication apparatus having the functions as mentioned above will be described with reference to FIG. 3 showing a flow chart showing the procedure. In FIG. 3, the system in the apparatus determines at the step S1 whether or not a dial number entered from the keyboard 3 to set up a communication line is quick dial. If it is not quick dial, the system jumps to step S17 where the dial number is sent out to the communication line, a call is generated, and data transmission is started.

If the entered dial number is quick dial, the answer to the step S1 is affirmative and then the system advances to the step S2 where it searches the entered quick dial in the quick dial memory section 11.

At the step S3, the system determines whether or not a block number indicating that the quick block data corresponding to the searched quick dial, and this quick dial as well are stored in the quick dial memory section 11.

If it is stored, the answer to the step S3 is affirmative and the system goes to the step S4. At this step S4, the block number is read out as a readout address from the quick block data memory section 13.

At the step S5, the system confirms a positional relationship (layout) of the quick block data and the block data, or the document body data, stored in the block data memory section 14. On the basis of the confirmed layout, the system checks at the step S6 whether or not both block data overlap each other. If the blocks overlap, the system discriminates in the steps S7 to S9 the contents of setting the overlap processings in the overlap-processing setting section 19 which stores the processings dealing with the case where the blocks overlap.

Firstly, at the step S7, the system determines whether or not the overlap processing is set for deleting the quick block data. If the answer is YES the system executes the job of step S10 where the quick block is removed from the document data to be transmitted.

If the answer to the step S7 is NO, the system advances to step S8 where it determines whether or not the overlap processing is set for modifying the layout. If the answer to the step S8 is YES, the system goes to the step S11.

At the step S11, the system determines whether or not the quick block data and the document body data, when rearranged, are located within one page while not overlapping, on the basis of the layout data (coordinates values) of both the blocks.

When the blocks are both located within one page, the step S12 is executed to modify the layout. The layout is modified in a manner that the coordinates values of the quick block data and the block data are adjusted to vertically and horizontally move the blocks within one page so that the blocks, not overlapping, are both located within one page.

If the answer to the step S11 is No, the system proceeds to the step S13 where the quick block is removed from the document data to be transmitted. If the blocks cannot be properly rearranged, the system may go to the step S9 according to the setting of the overlap processing.

If the answer to the step S8 is NO, the system goes to the step S9 where it determines whether or not the overlap processing is an overwrite processing in which the quick block is attached to the document data irrespective of the data overlapping. If it is the overwrite processing, the answer to the step S9 is YES and the system goes to the step S14. In the job of this step, the quick block data is written over the document body data. If the answer to the step S9 is NO, the step S15 is executed to attach a flag for giving the quick block data an optical transmission property.

After the processings in the steps S10 to S15, the operation advances to the next step S16 where it is confirmed whether there are the following pages or not and then it is specified whether or not to add quick block in the following pages. If "Yes" in the step S16, the operation returns back to the step S4 where the same edit operation described above is carried out with regard to the following pages. In case of "No" in the step S16, the operation advances to the step S17 to transmit the information.

Figure 4:
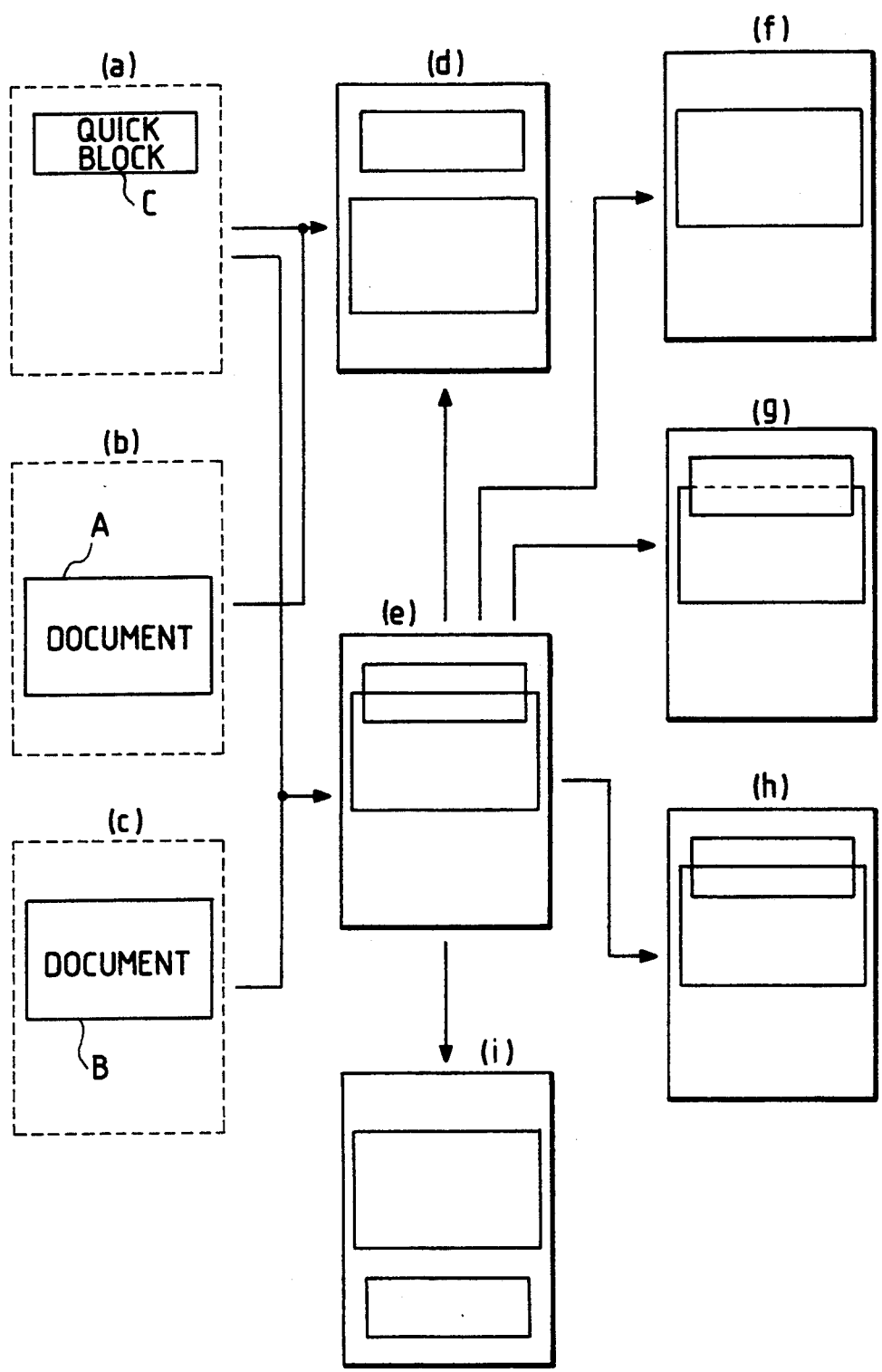
FIG. 4 is a chart showing examples of layouts of blocks on one page.

The following describes specific examples of the layouts of the quick block data and the document body, along with their respective layouts after being rearranged. FIG. 4 is used for the description. In the figure, a quick block data C with coordinates located as shown in FIG. 4(a) and a data block (document body A) with coordinates located as shown in FIG. 4(b) are composed to have a layout where the blocks do not overlap as shown in FIG. 4(d).

A document body B with coordinates located as shown in FIG. 4(c) and the quick block data C are composed to have a layout as shown in FIG. 4(e) where the blocks overlap. In the layout, a part of the document body B is written over the quick block data C. In this case where both the blocks overlap each other, those blocks are rearranged in accordance with any of preset instructions; an instruction to modify the layout as shown in FIG. 4(d), an instruction to delete the quick block data as shown in FIG. 4(f), an instruction to overwrite the quick block data over the document body as shown in FIG. 4(g), and an instruction to give the document body an optical transmission property as shown in FIG. 4(h). When an operator does not desire to modify the layout, the quick block data may be moved to a vacant portion of the document as shown in FIG. 4(i).

As described above, in the embodiment mentioned above, the quick block data is registered in association with the quick dial. Where there is a possibility that the quick block data will overlap with the document body, such overlap processings as layout modification and quick block data deletion are properly selected in accordance with a preset instruction. The data blocks are subjected to the selected overlap processing.

In the description thus far made, the example where the quick block data is added to one page has been discussed. It is evident that a plural number of quick block data may be added to one page. For example, the names of an addressee and addresser may be located above and below a document body, respectively.

Where a document to be transmitted consists of a plural number of pages, it is possible that a desired page is specified as necessary and the quick block data is added to the specified page.

For the quick block data used common to different receiving stations, for example, the name of an addresser, there is no need for generating and registering the quick block data for each quick dial. Such quick block data may be registered as single quick block data with a common block number.

Additionally, a select means may be provided by which a user can select use or nonuse of the quick block data before his communication.

As seen from the foregoing description, the data to be attached to a document body can be previously registered in association with quick dial. This feature eliminates the troublesome and time-consuming work to prepare a block including the attached data and to attach the prepared block to a document body.

The layout data can be added for each quick block data. With the layout data, the quick block data can be placed at a proper location on one page.

What is claimed is:

1. A mixed mode communication apparatus comprising:

quick dial storing means for storing dial numbers of called stations in association with quick dial numbers;

quick block data storing means for storing stereotyped data corresponding to each dial number that is stored in said quick dial storing means;

adding means operating such that when a quick dial is received, said adding means reads the stereotyped data associated with the received quick dial from said quick block data storing means, said adding means adding the readout stereotyped data to document body data to be transmitted;

block layout confirming means for confirming a layout of data blocks depending on whether or not the stereotyped data laps over document body data, when said stereotyped data is added to the document body data; and overlap processing means for performing an editorial processing so as to prevent the stereotyped data from lapping over the document body data when said block layout confirming means confirms that the stereotyped data laps ever the document body data.

2. The mixed mode communication apparatus according to claim 1 wherein said overlap processing means comprises block rearranging means for rearranging the document body data and the stereotyped data so as to prevent the document body data from overlapping the stereotyped data, by moving either of the document body data or the stereotyped data.

3. The mixed mode communication apparatus according to claim 1 wherein said overlap processing means includes delete means for deleting the stereotyped data when said block layout confirming means determines that the stereotyped data laps over the document body data.

4. The mixed mode communication apparatus according to claim 1 wherein said overlap processing means comprises overwrite means for writing the stereotyped data over the document body data when the stereotyped data laps over the document body data.

5. The mixed mode communication apparatus according to claim 1 wherein said overlap processing means comprises transmissible display means for giving an optical transmission property to the stereotyped data.

6. A mixed mode communication apparatus comprising:

quick dial storing means for storing dial numbers of called stations in association with quick dial numbers;

quick block data storing means for storing stereotyped data corresponding to each dial number that is stored in said quick dial storing means;

adding means operating such that when a quick dial is received, said adding means reads the stereotyped data associated with the received quick dial from said quick block data storing means, said adding means adding the readout stereotyped data to document body data to be transmitted;

block layout confirming means for confirming a layout of data blocks depending on whether or not the stereotyped data laps over the document body data;

overlap processing means for performing an editorial processing so as to prevent the stereotyped data from lapping over the document body data upon transmission when said block layout confirming means confirms that the stereotyped data laps over the document body data; wherein said overlap processing means can selectively rearrange the document body data and the stereotyped data, or delete the stereotyped data when said block layout confirming means determines that the stereotyped data laps over the document body data.

7. A mixed mode communication apparatus comprising:

quick dial storing means for storing dial numbers of called stations in association with quick dial numbers;

quick block data storing means for storing stereotyped data corresponding to each dial number that is stored in said quick dial storing means;

adding means operating such that when a quick dial is received, said adding means reads the stereotyped data associated with the received quick dial from said quick block data storing means, said adding means adding the readout stereotyped data to document body data to be transmitted;

block layout confirming means for confirming a layout of data blocks depending on whether or not the stereotyped data laps over document body data;

overlap processing means for performing an editorial processing so as to prevent the stereotyped data from lapping over the document body data upon transmission when said block layout confirming means confirms that the stereotyped data laps over the document body data; wherein said overlap processing means can be programmed for rearranging the document body data and the stereotyped data, or deleting the stereotyped data, or writing the stereotyped data over the document body data when said block layout confirming means determines that the stereotyped data laps over the document body.

8. A mixed mode communication apparatus comprising:

quick dial storing means for storing dial numbers of called stations in association with quick dial numbers;

quick block data storing means for storing stereotyped data corresponding to each dial number that is stored in said quick dial storing means;

adding means operating such that when a quick dial is received, said adding means reads the stereotyped data associated with the received quick dial from said quick block data storing means, said adding means adding the readout stereotyped data to document body data to be transmitted;

block layout confirming means for confirming a layout of data blocks depending on whether or not the stereotyped data laps over document body data;

overlap processing means for performing an editorial processing so as to prevent the stereotyped data from lapping over the document body data upon transmission when said block layout confirming means confirms that the stereotyped data laps over the document body data; wherein said overlap processing means can give an optical transmission property to said stereotyped data.

* * * * *

UNITED STATES PATENT AND TRADEMARK OFFICE
CERTIFICATE OF CORRECTION

PATENT NO. : 5,367,565
DATED : November 22, 1994
INVENTOR(S) : Tsunehiro MATSUI et al It is certified that error appears in the above-indentified patent and that said Letters Patent is hereby corrected as shown below:

Claim 1, Column 7, Line 7, "ever" should read --over--.

Signed and Sealed this

Twenty-third Day of May, 1995

Attest:

BRUCE LEHMAN

Attesting Officer     Commissioner of Patents and Trademarks